United States Patent [19]

Weihrich et al.

[11] Patent Number: 5,573,332
[45] Date of Patent: Nov. 12, 1996

[54] SCREW ELEMENT FOR A SCREW-LIKE EXTRUSION MACHINE

[75] Inventors: Gerhard Weihrich, Illingen; Werner Wiedmann, Stuttgart, both of Germany

[73] Assignee: Werner & Pfleiderer GmbH, Stuttgart, Germany

[21] Appl. No.: 607,920

[22] Filed: Feb. 28, 1996

Related U.S. Application Data

[63] Continuation-in-part of Ser. No. 292,876, Aug. 19, 1994, abandoned.

[30] Foreign Application Priority Data

Sep. 2, 1993 [DE] Germany ............................ 43 29 612.2

[51] Int. Cl.⁶ .................................. A21C 1/06; B01F 7/08; B28C 1/16
[52] U.S. Cl. ......................... 366/85; 425/204; 366/88
[58] Field of Search .................................. 366/83, 84, 85, 366/88, 89, 97, 90; 425/208, 209, 204

[56] References Cited

U.S. PATENT DOCUMENTS

| | | | |
|---|---|---|---|
| 3,305,894 | 2/1967 | Boden et al. | 366/88 |
| 3,667,733 | 6/1972 | Fritsch | 366/85 |
| 4,084,263 | 4/1978 | Millauer | 366/84 |
| 4,300,838 | 11/1981 | Sato et al. | 366/84 |
| 4,380,397 | 4/1983 | Hashizume et al. | 366/84 |
| 4,542,992 | 9/1985 | Markhart | 366/84 |
| 5,048,971 | 9/1991 | Wall et al. | 366/85 |
| 5,145,251 | 9/1992 | Shirato et al. | 366/85 |
| 5,153,009 | 10/1992 | Voight | 366/85 |
| 5,156,794 | 10/1992 | Nakanishi et al. | 366/84 |
| 5,186,539 | 2/1993 | Manser et al. | 366/85 |
| 5,318,358 | 6/1994 | Wobbe et al. | 366/85 |

FOREIGN PATENT DOCUMENTS

| | | | |
|---|---|---|---|
| 0160124 | 5/1989 | European Pat. Off. | |
| 862668 | 11/1952 | Germany. | |
| 949162 | 8/1956 | Germany. | |
| 2052480 | 9/1975 | Germany. | |
| 3011918 | 10/1980 | Germany. | |
| 42583 | 10/1972 | Japan | 366/85 |
| 35959 | 3/1980 | Japan | 366/84 |
| 6515135 | 5/1966 | Netherlands | 425/209 |
| 882769 | 11/1981 | U.S.S.R. | 366/83 |

Primary Examiner—David Scherbel
Assistant Examiner—Tony G. Soohoo

[57] ABSTRACT

In a screw element for the conditioning and/or processing of plastics or elastomers in a screw-type extruding machine having screw shafts drivable to rotate in the same direction and at least one pair of meshing screw elements, each screw element having a land of which the enveloping curve extends radially at a constant distance away from the respective shaft and, in the longitudinal direction, is of linear extension in parallel to the longitudinal axis of the shaft, a radially external screw land section near the housing running parallel to the inside wall of the housing with little play relative to the latter, for the purpose of moderate recirculation without stress points accompanied by strong axial and transverse mixing in a defined volume, it is provided that the enveloping curve encloses a blade land of reduced cross-sectional area referred to the enveloping curve, in that starting from the one axial end of the screw element and the first, in the circumferential direction external, end of the section, near the housing, of the enveloping curve, the blade ridge of the land, seen in the circumferential direction of an angle ρ, extends along part of this section, near the housing, of the enveloping curve and in that, in the axial direction, the blade ridge extends towards the second, in the circumferential direction external, end of the section, near the housing, of the enveloping curve.

14 Claims, 4 Drawing Sheets

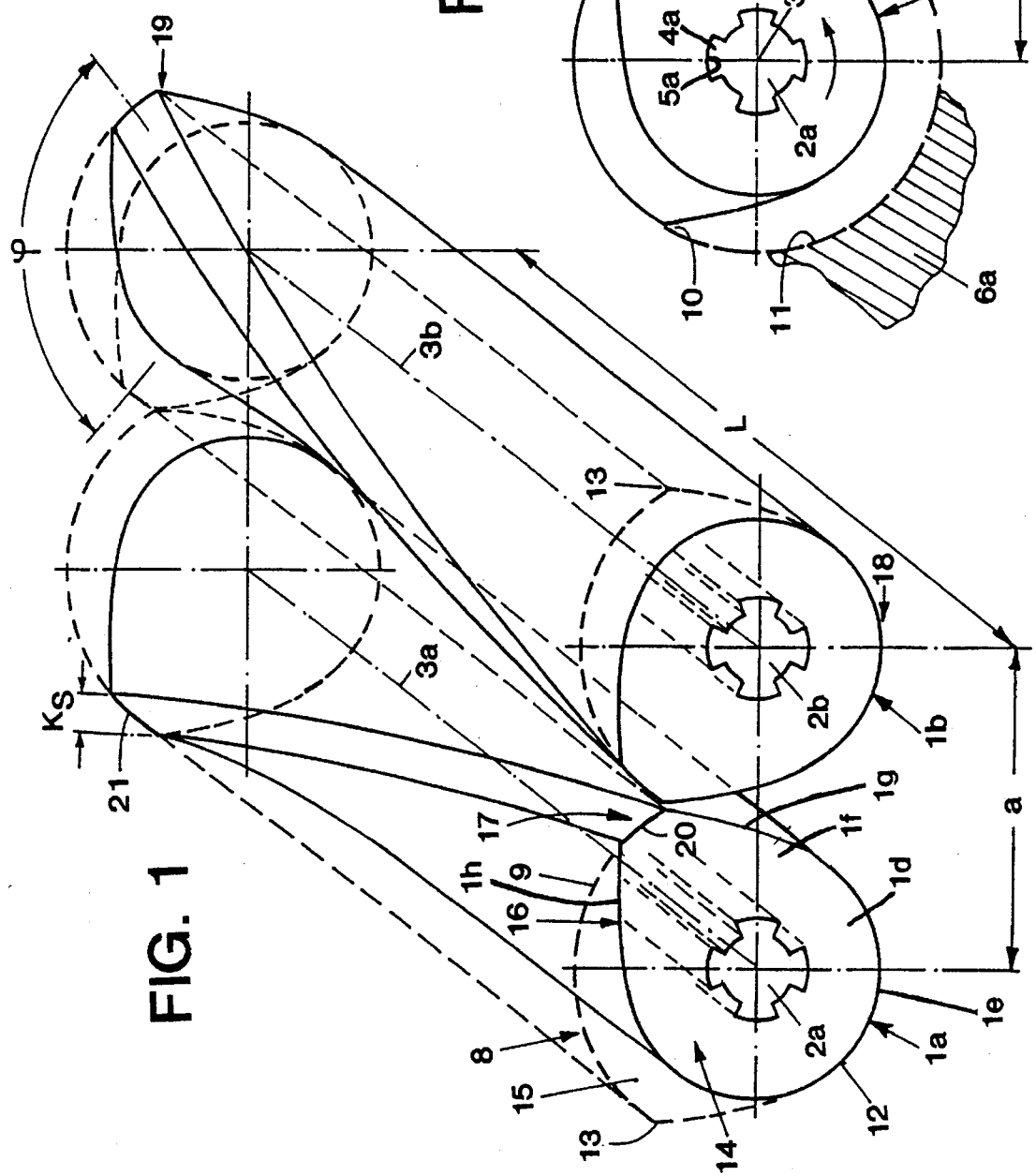

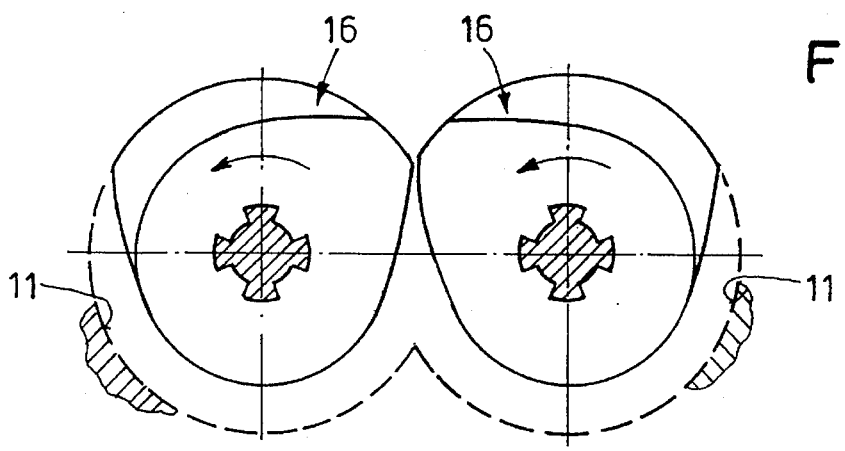
FIG. 4
d)
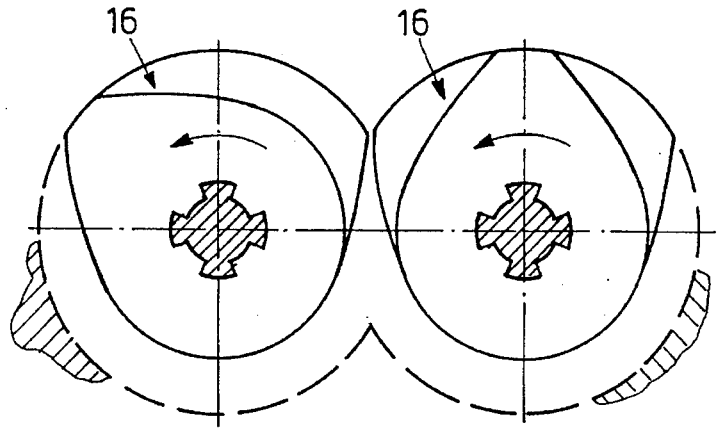
c)
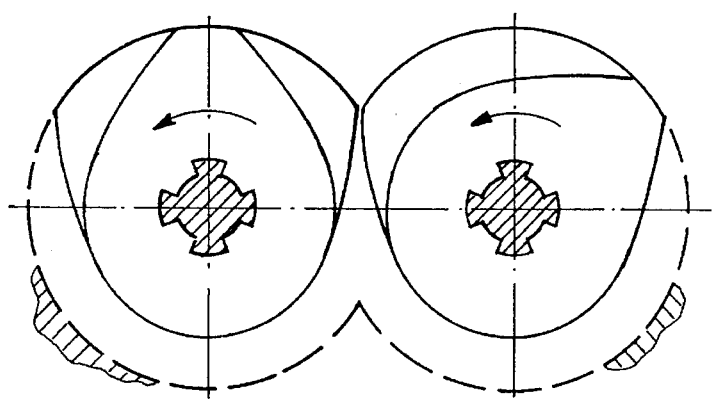
b)
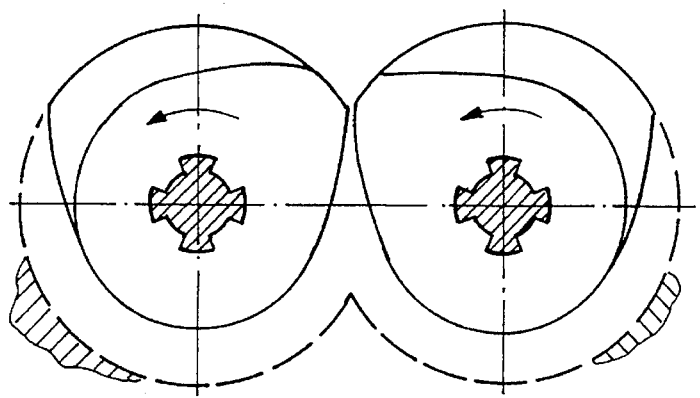
a)

SCREW ELEMENT FOR A SCREW-LIKE EXTRUSION MACHINE

This application is a continuation-in-part, of application Ser. No. 08/292,876, filed Aug. 19, 1994 now abandoned.

BACKGROUND OF THE INVENTION

1. Field of the Invention

The invention relates to a screw element for the conditioning and processing of plastics or elastomers in a screw-type extrusion machine having screw shafts drivable to rotate in the same direction and at least one pair of meshing screw elements, each screw element having a tear drop shaped cross-section with an outer periphery arcuate ridge that extends longiudinally the entire length of the shaft and at a constant radius from the shaft away from the respective shaft and, in the longitudinal direction, is of linear extension in parallel to the longitudinal axis of the shaft, a radially external screw land section near the housing extending in parallel to the inside wall of the housing with little clearance relative to the latter.

2. Background Art

A device of the generic type known from German published examined patent application 20 52 480 serves as a mixing device to remove volatile components from viscous masses, two mixing rotors being provided which are driven in the same direction and have axially directed, linearly extending paddle-shaped mixing wings, through which good degassing of the mix is to be achieved for the discharge of volatile components. The part of the housing taken by the mixing wings forms the mixing or reaction zone.

German patent 862 668 describes a kneading device having two unidirectionally driven shafts with kneading worms. These kneading worms continuously pass through the housing throughout the entire conveying portion and are single-flighted, i.e. they extend away from the shaft radially asymmetrically in only one direction.

German published patent application 30 11 918 describes a flow mixer having mixing worms and mixing blades following each other and disposed on shafts driven in opposite directions. In this device, uniform mixing is to be achieved and in addition inhomogeneities in polyolefine resin films are to be avoided.

German patent 949 162 relates to a screw-type kneading mechanism with damming elements in the form of screw flights rotating in opposite directions being formed on shafts rotating in opposite directions. European patent 0 160 124 discloses a twin-screw kneader of uniform twist with kneading disks, which has individual kneading zones with actively conveying, offset kneading disks. The individual kneading disks have a comparatively narrow ridge that is to work with as little play as possible relative to the wall of the housing. The kneading elements of this twin-screw kneader are conceived as kneading disks comparatively short in the axial direction, the ridges being of linear extension in the axial direction, i.e. without twist. Only the ridges of subsequent kneading disks can be offset by some angle one referred to the other.

SUMMARY OF THE INVENTION

It is an aspect of the invention to provide a plastic or elastomer treating apparatus having unidirectional tangent kneaders having screw kneaders with meshing teardrop screw elements on each screw shaft wherein the teardrop screw elements teardrop shape cross-section, with the cross-section having a lower segmented circular base and an upper portion with an apex that has a relatively narrow surface to form a ridge, the ridge extends the longitudinal length of the screw element and at a constant radial distance from the axis of the kneader shaft, the pitch of the ridge of each teardrop screw element as measured by its length has an angle of twist for its entire length of less than about 180° and the size of the screw element being such that the blade land is a small distance from the inside walls of the housing. Such configuration provides the advantages of tangent kneaders operating in opposite directions, namely the recirculation of the mix and minor occurrence of stress points, along with the advantageous self-cleaning of unidirectionally meshing systems.

With the structure of our unidirectional screw elements gentle recirculation and shearing without any stress points can be achieved accompanied by strong axial and transverse mixing in a defined volume, whereby for instance the uniform plastifying of polyolefine powders substantially free from pinholing and at gentle temperatures can be achieved accompanied by wide or bimodal molecular weight distributions.

Our teardrop screw element provides this in that the enveloping curve encloses a blade land of reduced cross-sectional area referred to the enveloping curve, in that starting from the one axial end of the screw element and the first, in the circumferential direction external, end of the section, near the housing, of the enveloping curve, the blade ridge of the land, seen in the circumferential direction, extends along part of the section, near the housing, of the enveloping curve, and in that, in the axial direction, the blade ridge extends towards the second, in the circumferential direction external, end of the section, near the housing, of the enveloping curve.

In other words, our screw has land, known as a mixing wing from German published examiner patent application 20 52 480 or from the sectional representation of FIG. 3 of German patent 862 668, that is cut on either side for the blade land to form, so that a comparatively narrow screw land results, a blade ridge remaining on the radial outside extending parallel to and at a small distance from, the inside wall of the housing and having a pitch seen in the axial direction. Correspondingly, it is conceivable that a blade land extending at some angle relative to the longitudinal axis of the shaft is produced from an inherently straight screw land or from the imaginary enveloping curve of such a screw land, so that the circumferential portion, along which adjacent screw elements scrape each other and the inside wall of the housing, is reduced in relation to the screw lands of the prior art.

Thus are achieve that a helical configuration of the blade ridge within the portion, near the housing, of the enveloping curve without the risk of collision with the screw element on the other respective shaft. Correspondingly, elements of right-hand pitch and left-hand pitch can mesh as well as elements of different pitch. The radial clearance relative to the housing can be adjusted to the respective process so as to achieve gentle shearing. The axial and transverse mixing can be preset by the selection of the pitch or of combinations of pitches of different screw elements. The length of the mixing zone is easily variable, there being the possibility for the housing diameter in the mixing zone to be the same as in the remaining screw extruder. The blade lands of reduced cross-sectional area as compared with conventional screw lands serve to achieve an increased specific dwell time in comparison to conventional solutions. The temperature of the mixing zone can be regulated by way of the housing wall. The elements and the blade ridges, respectively, scrape the wall of the housing at the preset clearance. A plurality of mixing zones can be realized within one and the same extruder.

Our screw element is suitable in particular for the plastifying and homogenizing of polyolefines of bimodal or wide molecular weight distribution. The powder leaving the polymerisation reactor contains zones polyolefines melting to have a low or high viscosity. These must be mixed homogeneously in the ensuing twin-shaft (or multi-shaft) screw-type extrusion machine of unidirectional rotation. It is especially important that shearing and yield stresses are applied to the product uniformly and gently over a prolonged period. Stress points as they conventionally occur in the gusset between the two screws result in inhomogeneities and are avoided by the configuration according to the invention, because a large volume mixing and yielding effect is achieved by way of the dwell time and yield flows in the blade wedge gap, which effect differs fundamentally from the flows of conventional, meshing screw-type extrusion machines of continuous operation. The manufacture of polymer blends from polymers of low and high viscosity is a further application of our screw element.

In keeping with a further aspect of the invention it can in particular be provided that, seen in the circumferential direction, the pitch in the axial direction of the blade ridge corresponds to a twist angle P of approximately 90°. Advantageously, the width of the blade ridge seen in the circumferential direction of the angle P can be about one fifth of the section, near the housing, of the enveloping curve.

Another aspect is to provide our screw elements such that they are non-rotatable relative to the shaft by means of a groove and key joint.

The groove and key joints can be such that the screw elements of a shaft or of adjacent shafts are placeable at different angular positions one referred to the other. Accordingly, there is the possibility to offset the screw elements following each other on a shaft by some angle and to realize any such configurations also in relation to the adjacent screw elements on the other shaft. This can for instance serve to achieve a division of the product flow in the direction of the axis by means of the stepwise offset arrangement of the screw elements in the axial direction.

In particular, it can be favorable for adjacent screw elements to be easily slid or placed on adjacent shafts such that there are opposite directions of the pitch of the blade ridge of the adjacent screw elements (left-hand pitch or right-hand pitch, respectively).

The geometry of the screw element may advantageously be selected such that the pitch equals about 3.33 or about 6.67 times the screw diameter. To advantage, the length of the screw element is about equal to the screw diameter.

For the possibility of variably associating the individual screw elements with each other, the invention relates to a screw shaft with a plurality of teardrop screw elements, it being provided that screw elements of different pitch of the blade ridge are disposed one after the other. In this context, it can be provided for the formation of an asymmetric mixing zone that two teardrop screw elements with a blade ridge of left-hand pitch and one teardrop screw element with a blade ridge of right-hand pitch are arranged in axial sequence on a first shaft, and that one teardrop screw element with a blade ridge of right-hand pitch and two teardrop screw elements with a blade ridge of left-hand pitch are disposed axially one after the other by corresponding association on another screw shaft.

Alternatively, it can be provided that in axial sequence, each screw element is offset by a certain angular measure in relation to the respectively preceding screw element.

Further, provision can be made for the screw elements of the first shaft to have a pitch corresponding to the conveying direction and the screw elements of the second shaft to have a pitch opposite to the conveying direction.

Further aspects and advantages of the invention will become apparent from the ensuing exemplary embodiment taken in conjunction with the drawings.

BRIEF DESCRIPTION OF THE DRAWING

FIG. 1 is a diagrammatic perspective view of two teardrop screw elements ar ranged one beside the other on two shafts driven to rotate in the same direction, FIG. 2 is a section about in accordance with the front view for the illustration of the geometric relations, FIGS. 4a to 4d are diagrammatic sections in accordance with the lines a to d of FIG. 3.

DESCRIPTION OF THE PREFERRED EMBODIMENT

Figure 3:
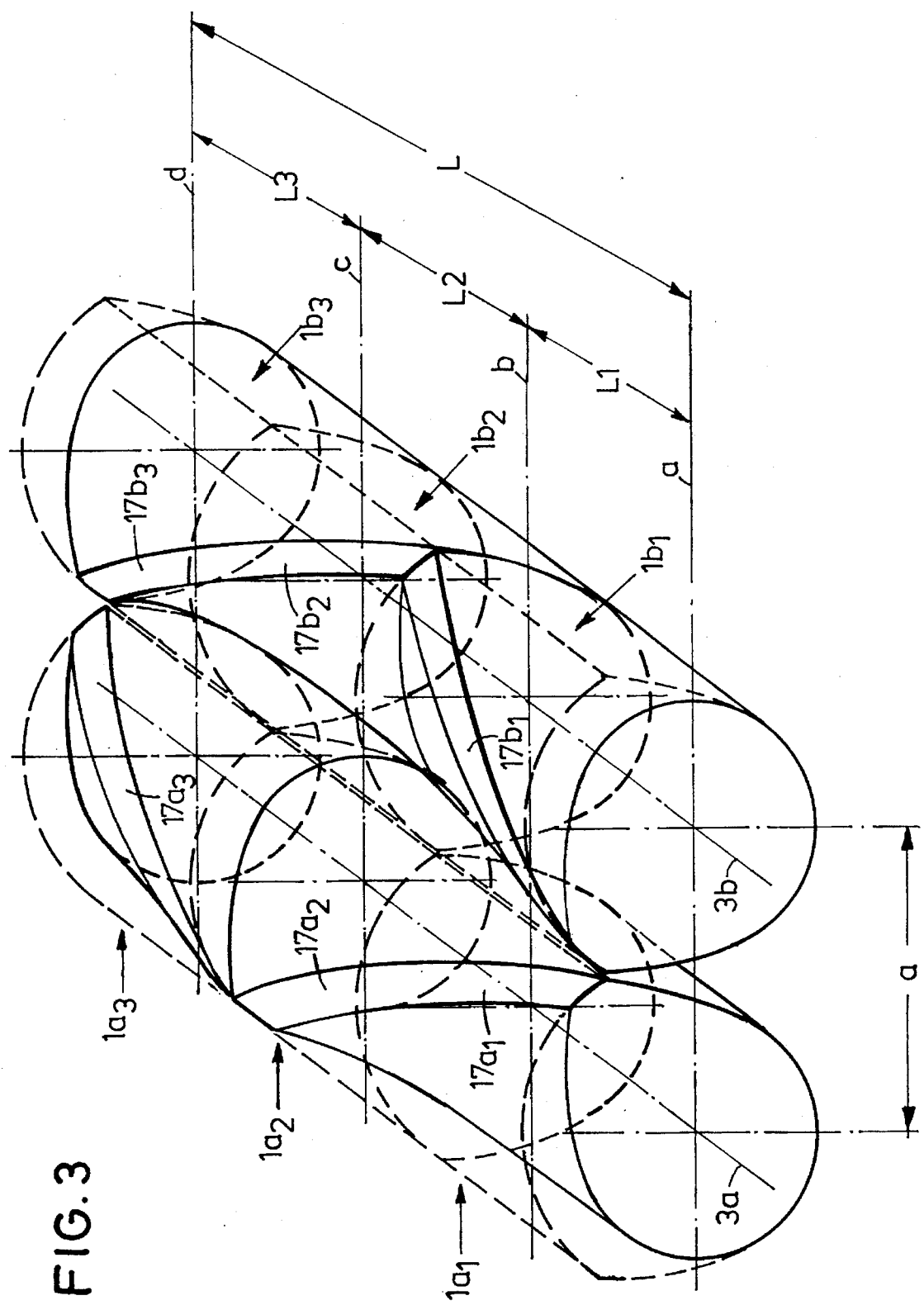
FIG. 3 is a perspective illustration corresponding to FIG. 1, of three teardrop screw elements arranged in axial sequence on a shaft.

FIG. 1 illustrates two teardrop screw elements 1a and 1b according to the invention, the left teardrop screw element 1a of the drawing being disposed on a first shaft 2a and the right teardrop screw element 1b of the drawing being disposed on a shaft 2b, the longitudinal axes 3a, 3b of the shafts 2 extending in parallel at a distance a relative to each other.

The cross-section of the teardrop screw is a teardrop shape cross-section having a lower segmented circular base and an upper portion with an apex that has a relatively narrow blade surface to form a ridge that extends the longitudinal length of the screw element and at a constant radial distance from the axis of the kneader shaft. The size of the screw elements 1a and 1b being such that the ridge is spaced a small distance from the inside walls of the housing.

The tear drop screw element 1a has a segmented cylindrical base 1d with an outer segmented cylindrical surface, 1e. The segmented cylindrical surface 1e illustrated has an outer circumference of greater than 180°. However, the arc of the outer surface can be at least 120°. The segmented cylindrical base has an angle of twist for its longitudinal length of less than 180° and preferably a twist of about 50° to about 110°. From the ends of the segmented cylindrical base 1d is a curved obelisk upper portion 1f having outer surfaces 1g and 1h converging from the base 1d to the frusto apex or blade ridge 17. The blade ridge 17 has a constant width for the length of the screw element. The blade ridge has a twist for its longitudinal length of less than 180° and preferably a twist of about 50° to about 110°.

The tear drop screw element 1b has a segmented cylindrical base 1j with an outer segmented cylindrical surface, 1k. The segmented cylindrical surface 1k illustrated has an outer circumference of greater than 180°. However, the arc of the outer surface can be at least 120°. The segmented cylindrical base has an angle of twist for its longitudinal length of less than 180° and preferably a twist of about 50° to about 110°. From the ends of the segmented cylindrical base 1j is a curved obelisk upper portion 11 having outer surfaces 1o and 1p converging from the base it to the frusto apex or blade ridge 17. The blade ridge 17 has a constant width for the length of the screw element. The blade ridge has a twist for its longitudinal length of less than 180° and preferably a twist of about 50° to about 110°.

As roughly outlined in FIG. 2, the screw elements 1a and 1b are fixed to be slippable and non-rotatable on the shafts 2 in the longitudinal direction by means of longitudinally extending projections 4 on the shafts 2 and corresponding recesses 5 on the screw elements 1a and 1b. Each screw element 1a and 1b has an extension L in the axial direction.

Each screw element 1a and 1b is disposed in a housing 6 in the form of a segment of a circle, the housing section 6a, 6b intersecting while forming gussets 7.

An enveloping curve 8 is drawn in dashed lines in FIG. 1, the external contour of which curve corresponds to that of prior art screw elements corresponding for instance to FIG. 3 of German patent 862 668. This enveloping curve 8 has a section 9 near the housing, of which the curvature substantially corresponds to the curvature of the housing 6 and extends by minor clearance in relation to the inside wall 11 of the housing (roughly outlined at 10 in FIG. 2). A second section 12 of the enveloping curve encloses the longitudinal axis 3 defining the respective center of rotation and passes into the first section 9 of the enveloping curve along a demarcation line 13. With the exception of the area of transition to the first section 9 of the enveloping curve, the second section 12 of the enveloping curve extends at a preset distance from the inside wall 11 of the housing 6.

The new configuration according to the invention is to be imagined as having been produced from the conventional profile corresponding to the enveloping curve 8 by the removal of material as follows:

The conventional profile has a screw land 14 substantially formed by the uppermost part of the section 12 of the enveloping curve 8 and the section 9 of the enveloping curve 8. Material is to be imagined to have been removed from the portion 15 of this screw land so that a blade land 16 results that extends from the central longitudinal axis 3 in the radial direction towards the inside wall 11 of the housing.

The blade land 6 thus formed has a radial external section, a blade ridge 17. The width $K_S$ of the blade ridge 17 or the corresponding section extending in the circumferential direction, are part of the section 9 of the enveloping curve, and its length in the circumferential direction is about one fifth of the length in the circumferential direction of the section 9 of the enveloping curve 8.

The blade ridge 17 extends in the longitudinal direction from the front end 18 to the rear end 19 of each screw element 1 with a pitch of $$h = \frac{360}{\rho} \cdot L.$$

Given an angle at circumference of $\rho > 0$, the blade ridge 17 is biased in relation to the respective longitudinal axis 3. In this case, the blade ridge 17 extends from the first external end portion 20 of the enveloping curve section 9 near the housing towards the second, circumferentially external section 21 of the enveloping curve section 9 near the housing, in the example of embodiment such that an angle at circumference $\rho$ of about 90° is bridged, corresponding to the pitch over the length L of each screw element 1a and 1b. The blade ridge 17 can have a lefthand pitch as with the screw element 1a of FIG. 1 or a right-hand pitch as with the screw element 1b of FIG. 1.

As seen in FIG. 2, the pitch of the blade ridge 17 results from the angle at circumference $\rho$ measured from the central point 22 of the blade ridge 17 at one screw end 18 to the central point 23 of the blade ridge 17 at the other screw end 19.

FIG. 3 illustrates a combination of three screw elements arranged one after the other in the axial direction, three screw elements $1a_1$, $1a_2$, $1a_3$ at a time being disposed on a first shaft represented by the longitudinal axis 3a and three screw elements $1b_1$, $1b_2$, $1b_3$ on a shaft extending parallel to the latter and represented by the longitudinal axis 3b. Each individual screw element has an axial length $L_1$, $L_2$ and $L_3$, which lengths add up to an overall length L of a mixing zone for instance formed by this combination of screw elements.

As regards the pitch and the relative position in the circumferential direction, the screw elements are slipped on the shafts to be non-rotatable such that the blade ridge $17a_1$ is carried on by the blade ridge $17a_2$ of identical pitch and without interfacial misalignment, i.e. in steady continuation. These two screw elements are followed by a third screw element $1a_3$, of which the blade ridge $17a_3$ continues the blade ridge $17a_2$, however at a reverse pitch, i.e. two screw elements $1a_1$ and $1a_2$ of left-hand pitch are followed by a screw element $1a_3$ of right hand pitch in the view of FIG. 3.

A screw element $1b_1$ having a blade ridge $17b_1$ of right-hand pitch is provided on the shaft represented by the longitudinal axis 3b to the right in FIG. 3, followed by a screw element $1b_2$ with a blade ridge $17b_2$ of left-hand pitch and, in steady continuation of the blade ridge, by a further screw element $1b_3$ having a blade ridge $17b_3$ of left-hand pitch. Correspondingly, the arrangement of the screw elements on the left and on the right side is asymmetric referred to the central longitudinal axis.

FIGS. 4a through 4d illustrate which cross-sectional configuration results along the lines a to d in FIG. 3, there being in particular illustrated that the blade ridges 16 are of self-scraping effect cyclically, and that for most of their motion in the circumferential direction, they extend with minor play relative to the inside wall 11 of the housing, some clearance nevertheless remaining in the axial direction.

Figure 5:
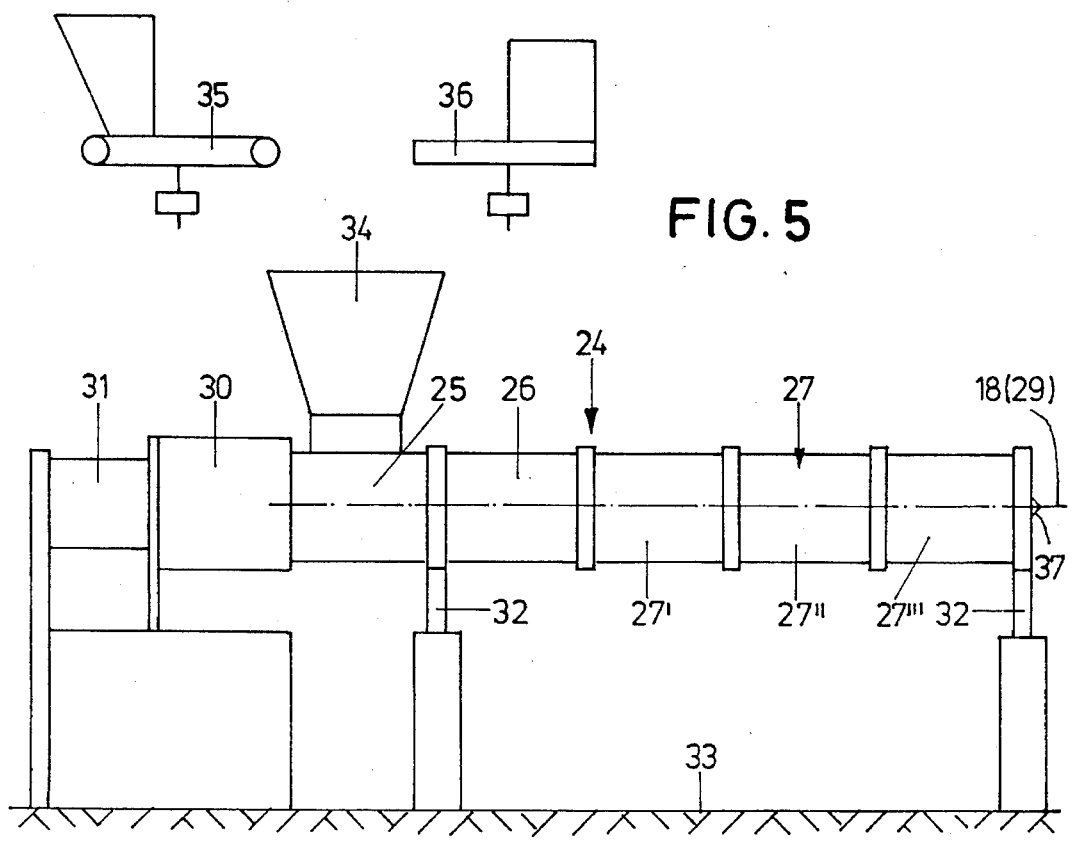
FIG. 5 is a graph of a screw-type extrusion machine in which the screw elements according to the invention are used.

Tear-drop screw elements of the type according to the invention can be used in a screw-type extruding machine as it is diagrammatically shown in FIG. 5. This screw-type extruding machine has a housing 24 comprising a plurality of sections 25, 26, 27, which are disposed axially one behind the other and flanged to one another. The housing section 27 comprises the sections 27', 27" and 27'". Two drillholes 28, 29 of parallel axes and of horizontal-figure-eight-type intersection are provided in the housing 4. Concentrically of the axes of the drillholes, two shafts 2 are located in the housing 24 which are driven via a gearbox by a motor 31. The housing 24 and the gearbox 30 as well as the motor 31 are supported on the ground 33 by way of stands 32. A receiving hopper 34 discharges into the first housing section 25 serving as a feed zone; material to be processed is supplied to the receiving hopper 34 for instance by a proportioning device 35 in the form of a conveyor-type weighing equipment for instance for granulates, and/or by a proportioning device 36 in the form of a proportioning worm for instance for powder. An outlet 37 is provided at the housing section 27.

The drive of the shafts 2a and 2b, respectively, via the motor 31 and the gearbox 30 is unidirectional, i.e. the shafts 2 rotate in the same direction.

The mixing zone comprising the screw element configuration as illustrated in FIG. 3 can be disposed for instance in the housing section 27 subsequent to a feed and conveying zone.

As regards the ensuing exemplary embodiment and the test described in the following, the sequence in the axial direction of the various elements disposed on the shafts 2 is shown only diagrammatically in FIG. 5.

Figure 6:
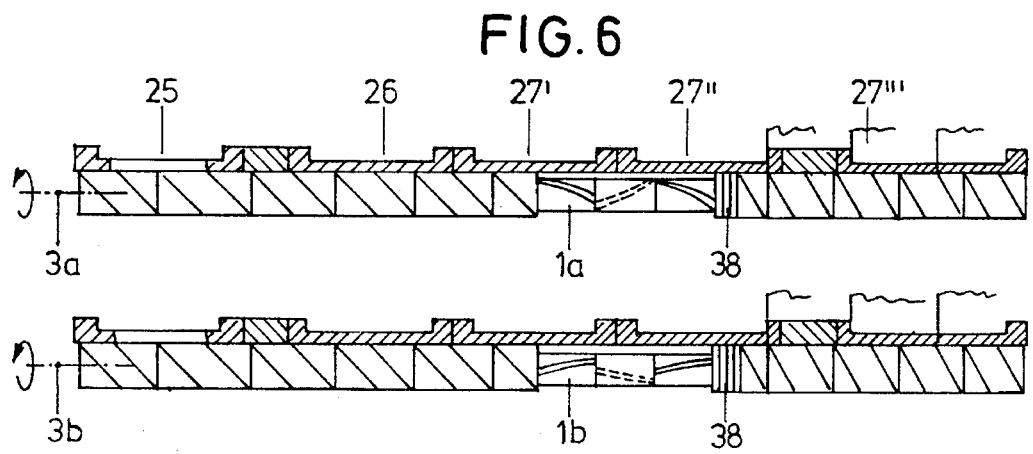
FIG. 6 is a graph of the sequence of the various kneading and mixing elements on the two shafts of a twin-shaft screw-type extrusion machine with teardrop screw elements according to the invention being used.

As an alternative of the embodiment shown in FIG. 3, and for the purpose of the ensuing application, the screw elements can be disposed such that the elements $1a_1$ and $1a_2$ located on one particular shaft have the same pitch, but are offset by 84° one after the other in the circumferential direction, as shown in FIG. 6.

A machine of the type ZSK90 of the company of Werner & Pfleiderer having shafts driven to rotate in the same direction is used as a kneader. The throughput of such a screw-type extruding machine ranges from about 55 to 330 kg/h at 30 to 180 rpm. The plastics granulates processed are bimodal HDPE, the plastifying and homogenization of this material taking place by means of the screw elements according to the invention. The teardrop screw elements 1a, 1b located on the shafts 3a and 3b are disposed such that the screw elements 1a of the shaft 3a convey in the conveying direction and the screw elements 1b of the shaft 3b convey in the direction opposite to the conveying direction. In the example of embodiment the screw elements 1a, 1b according to the invention are followed by an accumulation zone 38.

It has been found that the screw arrangement according to the invention produces a strikingly low count of pinholing (i.e. inhomogeneities or fish eyes) of a number of less than 200 per 60 m of foil, given low energy supply (0.11 to 0.21 kwh/kg) and temperature (184° to 221° C.) over the entire travel, i.e. the screw arrangement according to the invention results in moderate conditions, avoiding the decomposition of molecules, so that the ultimate tensile strength is not reduced. With conventional kneading block screws, the pinholes range from 100 to 10,000 per 60 m of foil at elevated energy supplies and temperatures.

What is claimed is:

1. A teardrop screw element for a screw-type apparatus to condition and process plastics or elastomers comprising;

said teardrop a screw element having a central bore to attach said teardrop screw element to a drive shaft, said teardrop screw element has a teardrop shape cross-section, said cross-section has a segmented cylindrical base and an upper portion with a flat apex, said apex forming an outer periphery ridge that extends longitudinally and at a constant diameter for the length of said screw element, said outer periphery ridge having an angle of twist as measured by its length that is less than 180°, and said outer periphery ridge being shaped and sized to mesh with a corresponding adjacent teardrop screw element when said teardrop screw element and said adjacent teardrop screw element rotate in the same direction.

2. The screw element according to claim 1, wherein the pitch of said blade ridge and is approximately 6.67 times a diameter of said blade ridge.

3. The screw element according to claim 1, wherein the pitch of said blade ridge is approximately 3.33 times a diameter of said blade ridge.

4. The screw element according to claim 3, wherein the length of the screw element is approximately equal to a diameter of said blade ridge.

5. The screw element of claim 1 wherein said bore has a plurality of key grooves to attach said screw element to a drive shaft.

6. The screw element of claim 1 wherein said angle of twist is from about 50° to about 110°.

7. The screw element of claim 6 wherein said blade ridge has a right-hand pitch to mesh with said adjacent screw element which has a second blade ridge with a left-hand pitch.

8. A teardrop screw element according to claim 6 wherein said bore of said tear drop screw element is shaped to permit said tear drop screw element to slide on and be non-rotatable relative to said drive shaft.

9. The screw element according to claim 8, wherein the length of the screw element is approximately equal to a diameter of said blade ridge.

10. In an apparatus for conditioning and processing plastics or elastomers with screw elements comprising, a first and second screw shaft in side-by-side parallel relationship, said first shaft having a first teardrop screw element attached thereto, said first teardrop screw element having a teardrop shape cross-section, said cross-section has a lower segmented circular base and an upper frustro-triangular top having a flat apex defining an outer periphery first arcuate ridge, said first arcuate ridge extending longitudinally and at a constant radius for the entire length of said first teardrop screw element, said first arcuate ridge having a left-hand blade pitch as measured by its length that has an angle of twist for its entire length of less than about 180°, said second shaft having a second teardrop screw element attached thereto, said second teardrop screw element having a second teardrop shape cross-section, said second cross-section having a lower segmented circular base and an upper frustro-triangular top having a flat apex defining an outer periphery second arcuate ridge, said second arcuate ridge extending longitudinally and at a constant radius for the entire length of said second teardrop screw element, said second arcuate ridge having a right-hand blade pitch as measured by its length that has an angle of twist for its entire length of less than about 180°, means to drive both said first and second shafts in the same direction, the distance between the longitudinal center lines of said first and second screw shafts being less than the combined radius of said first arcuate ridge and the radius of said second arcuate ridge, said radius of said first arcuate ridge being equal to said radius of said second arcuate and greater than the radius of said first segmented cylindrical base, said second arcuate radius of said ridge being greater than the radius of said second segmented cylindrical base, and said first and second teardrop screw elements being sized and shaped to mesh with each other when said shafts are driven in the same direction.

11. The apparatus of claim 10 wherein said angle of twist for said first ridge is about 50° to 110° and said angle of twist for said second ridge is about 50° to about 110°.

12. The apparatus of claim 11 wherein a width of the first blade ridge is about 20% of the circumferential distance of the first blade twist and a width of the second blade ridge is about 20% of the circumferential distance of the second blade ridge.

13. The apparatus of claim 10 wherein both the first and second screw shafts have more than one teardrop screw element attached thereto.

14. The apparatus of claim 13 wherein said first screw shaft has three axially aligned teardrop screw elements with a first and third teardrop screw element having a left-hand pitch and a second teardrop screw element being between said first and second screw elements, said second teardrop screw element having a right-hand pitch, said second screw shaft has three axially aligned teardrop screw elements with a fourth and sixth teardrop screw element having a right-hand pitch and a fifth teardrop screw element being between said fourth and sixth screw elements, said fifth teardrop screw element having a left-hand pitch, said first, second, third, fourth, fifth and sixth screw element being sized, shaped and positioned such that the first meshes with said fourth screw element, said screw element meshes with said fifth screw element and said third screw element meshes with said sixth screw element.

* * * * *